United States Patent Office 3,413,285
Patented Nov. 26, 1968

3,413,285
AMINO-ACETYLAMINO-CHOLESTANES
Georges Tsatsas, Athens, Greece, assignor to Ciba Corporation, New York, N.Y., a corporation of Delaware
No Drawing. Continuation-in-part of application Ser. No. 487,300, Sept. 14, 1965. This application June 28, 1966, Ser. No. 561,045
Claims priority, application Switzerland, July 9, 1965, 9,631/65; Aug. 20, 1965, 11,766/65; Oct. 20, 1965, 14,495/65
24 Claims. (Cl. 260—239.5)

ABSTRACT OF THE DISCLOSURE 3-amino-cholestanes, their acid addition salts and quaternary ammonium derivatives, including those of the formula

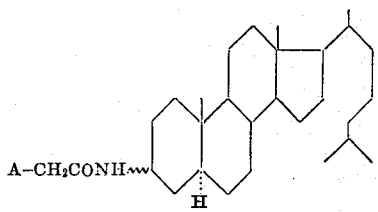

in which A is an aliphatic substituted amino group are provided, possessing tumor-inhibiting properties.

---

This is a continuation-in-part of application Ser. No. 487,300 filed Sept. 14, 1965, and now abandoned.

The present invention provides new 3-amino-cholestanes, acid addition salts and quaternary ammonium compounds thereof. The invention provides primarily 3-(amino-acetylamino)-cholestanes of the formula

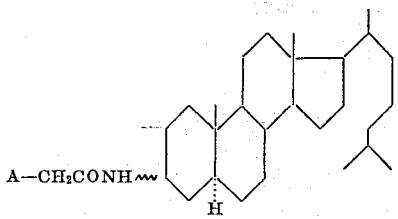

where A is an aliphatic substituted amino group—therapeutically acceptable acid addition salts or quaternary ammonium compounds thereof.

In these compounds an aliphatic substituted amino group is preferably an amino group of one of the formulae

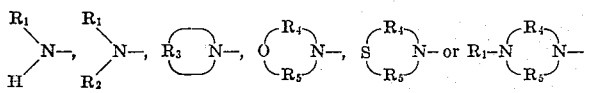

wherein $R_1$ and $R_2$ stand for lower aliphatic saturated or unsaturated residues, especially for lower alkyl, for example, methyl, ethyl, propyl or isopropyl radicals or linear or branched butyl radicals or cycloaliphatic radicals having 3 to 8 ring carbon atoms, for example cyclobutyl, cyclopentyl, cyclohexyl or cycloheptyl residues or unsaturated derivatives thereof, $R_3$ represents a linear or branched alkylene radical having 2 to 8 chain carbon atoms and $R_4$ and $R_5$ represent lower alkylene radicals having together 1 to 4 chain carbon atoms, thus forming together with the nitrogen atom of the amino group and with the other hetero atom which may be present for example 3-oxa- or 3-thia-pentylene-(1,5); 3-methyl-3-azahexylene-(1,6), 3-ethyl-1,5-dimethyl-3-azapentylene-(1,5) or 3-methyl-3-azapentylene(1,5) residues.

The aliphatic substituted amino group is in the first place a pyrrolidino, piperidino, morpholino, thiamorpholino or N'-lower alkyl-piperazino group such as the N'-methyl-piperazino group, or above all a di-lower alkyl-amino group such as the diethylamino or better still the dimethylamino group, or a butylamino or cyclohexyl-amino group.

As therapeutically acceptable acid addition salts there may be mentioned, for example, the salts of the hydrohalic acids, sulfuric and phosphoric acids, nitric and perchloric acid; aliphatic, alicyclic, aromatic or heterocyclic carboxylic or sulfonic acids, such as formic, acetic, propionic, oxalic, susccinic, glycollic, lactic, malic, tartaric, citric, ascorbic, hydroxymaleic, dihydroxymaleic, or pyruvic acid; phenylacetic, benzoic, para-aminobenzoic, anthranilic, para-hydroxybenzoic, salicylic or para-aminosalicylic acid; methanesulfonic, ethanesulfonic, hydroxyethanesulfonic, ethylenesulfonic acid; toluenesulfonic, naphthalenesulfonic acids or sulfanilic acid; methionine, tryptophan, lysine or arginine.

Quaternary amino compounds are those whose amino group contains a fourth substituent, especially the radical of an alcohol, preferably of a lower alkanol such as the methyl, ethyl, propyl or butyl radical, and contains as anion the radical of any desired organic or inorganic acid, especially of one of those mentioned above, or a hydroxyl group.

The new compound may be, for example, when a 3α- or 3β-aminocholestane is reacted with chloracetylchloride and the resulting 3-chloracetylamino-cholestane is reacted with an aliphatic substituted amine and, if desired, a resulting salt is converted into its free base and/or a resulting free base is converted into a therapeutically acceptable acid addition salt or a quaternary compound thereof.

The new compounds possess valuable pharmacological properties. Inter alia, they act above all as tumor inhibitors as can be demonstrated in animal tests, for example, on various transplantable tumors in the rat. The new compounds may therefore be used as tumor inhibitors. Particularly potent are the 3α-(di-lower alkylamino-acetyl-amino)-cholestanes, 3α-(lower alkylene - imino - acetyl-amino)-cholestanes, whose alkylene radical contains 4 to 6 carbon atoms and may be interrupted by an oxygen atom, their therapeutically acceptable acid addition salts and their quaternary ammonium compounds with lower alkylhalides, and especially 3β-(cyclohexylamino-acetyl-amino)-cholestane, its therapeutically acceptable acid addition salts and 3α-(diethylamino-acetylamino)-cholestane, its therapeutically acceptable acid addition salts and halogen-lower alkylates thereof. For example, when the latter product is given in 6 interperitoneal doses of 15 to 30 mg./kg. to rats suffering from uterus epithelium T–8G, it produces a distinct inhibition of the tumor mentioned.

The new compounds may be used in the form of pharmaceutical preparations containing the active substance, a salt thereof or a quaternary ammonium compound or mixtures thereof in conjunction or admixture with a solid or liquid pharamacetutical excipient, especially an excipient suitable for enteral or parenteral administration. Suitable excipients are substances that do not react with the new compounds, for example water, gelatin, lactose, starches, magnesium stearate, talcum, vegetable oils, benzyl alcohols, gums, polyalkyleneglycols or other known medicinal excipients. The pharmaceutical preparations may be, for example, tablets, dragees or capsules, or in liquid form solutions. They may be sterilized and/or may contain assistants such as preserving, stabilizing, wetting or emulsifying agents, salts for regulating the osmotic pressure or buffers. They may also contain further pharmacologically active substances known to be suitable for the above-mentioned sphere of application.

The new preparations contain, for example for oral administration, advantageously in the form of tablets, dragees or capsules, preferably 1 to 500 mg. and advantageously 5 to 50 mg. of the active substance per dosage unit. The dosage of the new preparations depends on the requirements of the individual patient. The preparations are formulated in the manner which is generally practised in preparing medicaments.

In veterinary medicine the process products may be used in one of the above-mentioned forms or in the form of animal fodders or of additives to animal fodders, using the usual extending and diluting agents or fodders respectively.

The invention includes also the use of the 3α- or 3β-(amino-acetylamino)-cholestanes, of a therapeutically acceptable salt and/or quaternary ammonium compound thereof, as well as of pharmaceutical preparations containing these compounds as a tumor inhibitor.

The following examples illustrates the invention, without however, restricting its scope.

EXAMPLE 1

A solution of 6.4 g. of 3α-aminochloestane (J. Chem. Soc. 1956, page 1649) in 100 ml. of chloroform is mixed with 10 g. of anhydrous sodium carbonate, and 1.8 ml. of chloracetylchloride are vigorously stirred in. The reaction solution heats up slightly and is kept for half an hour at the raised temperature. After cooling, the chloroformic solution is washed with water, then with dilute hydrochloric acid and one more with water until the washings run neutral. The solution is dried over sodium sulfate and evaporated to dryness. The solid residue is recrystallized from acetone. The resulting 3α-chloracetylamino cholestane melts at 202° C.

9.29 grams of the resulting chloracetamide are dissolved in 200 ml. of ethanol and 5.1 g. of piperidine are added. The whole is refluxed for 5 hours and the alcohol is then evaporated; the residue is treated with a saturated sodium bicarbonate solution and taken up in either. The ethereal solution is washed with water until the washings run neutral, dried over sodium sulfate and evaporated, to yield 3α-piperidino-acetylamino cholestane melting at 134 to 135° C.

On addition of an alcoholic solution of hydrochloric acid to an alcoholic solution of the base, the hydrochloride of 3α-piperdino-acetylamino cholestane is obtained which, after recrystallization from ethanol+anhydrous ether, melts at 213° C.

A solution of 4 g. of the base described above in 40 ml. of ethanol is mixed with 2.4 g. of methiodide. The whole is refluxed for 2 hours and then allowed to cool, whereupon the quaternary salt settles out; it is filtered off and washed with ether. The methiodide of 3α-piperidino-acetylamino cholestane obtained in this manner melts at 267° C. after recrystallization from ethanol. Optical rotation $[\alpha]_D^{24}=+14°$ (C=2.47% in chloroform).

3α-diethylamino-acetylamino cholestane is obtained in a similar manner. It is a brownish amorphous, semi-solid substance. Its picrate melts at 232° C. after recrystallization from ethanol. The hydrochloride melts at 205° C. with decomposition and the methiodide at 235° C. after recrystallization from ethanol+ether.

The hydrochloride obtained in a similar manner from 3α - morpholinoacetylamino - cholestane melts at 255–257° C. with decomposition, the base obtained therefrom in the customary manner melts at 146° C., and the methiodide at 238° C.

EXAMPLE 2

2.75 g. 3-amino-cholestane are dissolved in 100 ml. of chloroform and 20 ml. of a saturated sodium carbonate solution, and refluxed. There are added while stirring 0.77 ml. of chloracetylchloride. The mixture is refluxed for a further 4 hours. The 3β - chloracetylamino - cholestane, which after recrystallization from acetone and aqueous ethanol and sublimation melts at 215° C., is reacted with piperidine as described in Example 1. The 3β - piperidino - acetylamino cholestane thus obtained melts at 196° C. after recrystallization from methanol and sublimation. It forms a picrate melting at 159–160° C., which may be recrystallized from a mixture of acetone and ether.

In an analogous manner 3β - diethylamino - acetylamino cholestane melting at 164–165° C. may be obtained; its hydrochloride melts at 255° C. It forms a picrate melting at 184° C.

EXAMPLE 3

10 grams of anhydrous sodium carbonate are added to a solution of 6.4 g. of 3α-aminocholestane in 100 ml. of chloroform, then 1.8 ml. of chloroacetyl chloride are vigrously stirred in and the batch is boiled for ½ hour. The resulting 3α - chloroacetylamino - cholestane, which melts at 202° C. after recrystallization from acetone, is reacted with 2.8 g. of cyclohexylamine.. The batch is refluxed for 5 hours, then the alcohol is evaporated and the residue treated with a saturated sodium bicarbonate solution and taken up in ether. The ethereal solution is washed with water until the washings run neutral, dried over sodium sulfate and evaporated. On fractional crystallization the reaction mixture yields 3α-(cyclohexylamino - acetylamino) - cholestane melting at 127° C.; by adding an alcoholic solution of hydrochloric acid to an alcoholic solution of the base it is converted into the hydrochloride. After recrystallization from acetone the product melts at 171° C.

EXAMPLE 4

When 3β-amino-cholestane is reacted with chloracetyl chloride in a manner analogous to that described in Example 1, 3β-chloroacetylaminocholestane melting at 215° C. is obtained. The latter is then reacted with butylamine, and the hydrochloride of 3β-butylaminoacetyl-aminocholestane is obtained which, after recrystallization from acetone and ether, melts at 225–240° C. It forms a picrate melting at 220° C.

When cyclohexylamine is used instead of butylamine as described above, 3β-cyclohexylaminoacetylamino-cholestane is obtained whose picrate melts at 199–200° C.

EXAMPLE 5

Tablets are formulated in the usual manner from the following ingredients:

|  | Mg. |
|---|---|
| 3α - piperidino-acetylamino cholestane hydrochloride | 10.0 |
| Lactose | 66.0 |
| Wheat starch | 15.0 |
| Arrowroot | 5.0 |
| Talcum | 3.5 |
| Magnesium stearate | 0.5 |
|  | 100.0 |

A starch paste is prepared on a steam bath from one third of the wheat starch and five times the amount of deionized water. The active substance is reduced in a jet mill to an average particle size of about 5μ, mixed with the lactose, the powder mixture is uniformly moistened with the starch paste and kneaded until a mass has formed that can be granulated. The plastic mass is pressed through a sieve of 4–5 mm. mesh and dried at 45° C. The dry granulate is passed through a sieve of 0.8 to 1.5 mm. mesh and homogeneously mixed with arrowroot, talcum and magnesium stearate. The tablet mix is converted in the usual manner into scored tablets of 6 mm. diameter. Each tablet has a gross weight of 100 mg.

Further tablets of this kind contain, for example, instead of 3α-piperidino-acetylamino cholestane the corresponding 3β-compound, 10 mg. of the methiodide, of one of these compounds or the 3α- or 3β-diethylamino-acetylamino cholestane or its hydrochloride or methiodide or methochloride.

EXAMPLE 6

Solutions for injection, containing 10 mg. of active substance per ml. of solution, can be prepared, for example, from,

| | |
|---|---|
| 3α-diethylamino-acetylamino cholestane hydrochloride sterile microcrystals 20μ _____mg__ | 10.0 |
| Polyhydroxyethylene sorbitan monolaurate ___mg__ | 0.05 |
| Sodium chloride _____mg__ | 9.0 |
| Methylcellulose (of 100 cps. viscosity) ____mg__ | 50.0 |
| Sodium ethylmercurithiosalicylate _____mg__ | 0.05 |
| Sterile, distilled water to make _____ml__ | 1.0 |

The sodium chloride is dissolved in about two thirds of the total amount of water. The solution is heated to 80 to 90° C. and the methylcellulose stirred in. After cooling, the methylcellulose passes into solution. The whole is made up to the prescribed volume, the solution filtered under pressure through a sterile filter (layers of filtering asbestos) and sterilized in an autoclave for 20 minutes at 120° C. After having cooled, the solution must be stirred or shaken. The sodium ethylmercurithio-salicylate is then dissolved in a small amount of the suspending agent, and this solution is filtered through a glass sinter filter Jena G3 and combined with the methyl-cellulose solution.

The polyhydroxyethylene sorbitan monolaurate is mixed with a small amount of the suspending agent and likewise sterilized in the autoclave.

The sterile microcrystals of the active substance are the first triturated under aseptic conditions with the solution of the wetting agent and then diluted with the remainder of the suspending agent.

If necessary, the suspension may be homogenized with a flask homogenizer.

The suspension is charged under aseptic conditions into sterile ampoules of 1 ml. of sterile vials of 5 ml. capacity. The vials are closed with suitable sterile stoppers.

Suspensions for injection of this type can also be obtained, for example, by using instead of 3α-diethylamino-acetylamino cholestane its methiodide or, for example, the hydrochloride of 3α-piperidino-acetylamino cholestane or the corresponding 3β-compounds.

EXAMPLE 7

Oily injection solutions can be formulated in the following manner:

(a) Content of active substance 10 mg./ml.—

| | |
|---|---|
| 3α-piperidino-acetylamino cholestane hydrochloride _____mg__ | 10.0 |
| Benzyl alcohol _____mg__ | 100.0 |
| Sesame oil to make _____ml__ | 1.0 |

The active substance is dissolved in the benzyl alcohol. The solution is then made up to the prescribed volume with sterile sesame oil and charged in ampoules of 1 or 2 ml. capacity. The ampoules are sterilized in a hot-air chamber for 1½ hours at 160° C.

(b) Content of active substance 5m./ml.—

| | |
|---|---|
| Methiodide of 3α-diethylamino-acetylamino cholestane _____mg__ | 5.0 |
| Benzyl alcohol _____mg__ | 100.0 |
| Sesame oil _____ml__ | 1.0 |

The active substance is dissolved in the benzyl alcohol, and the solution is made up to the prescribed volume with sterile sesame oil and charged in ampoules of 1 or 2 ml. capacity. The ampoules are sterilized in a hot-air chamber for 1½ hours at 160° C.

Injection solutions of this type can also be formulated, for example, by using the hydrochloride of 3β-piperidino-acetylamino-cholestane (10.0 mg.) or the hydrochloride of 3β-morpholino-acetylamino-cholestane (5.0 mg.).

EXAMPLE 8

Tablets are formulated in the usual manner from the following ingredients:

| | Mg. |
|---|---|
| 3β - cyclohexylamino - acetylamino - cholestane hydrochloride _____ | 10.0 |
| Lactose _____ | 66.0 |
| Wheat starch _____ | 15.0 |
| Arrowroot _____ | 5.0 |
| Talcum _____ | 3.5 |
| Magnesium stearate _____ | 0.5 |
| | 100.0 |

A starch paste is prepared on a steam bath from one third of the wheat starch and five times its own weight of deionized water. The active substance is reduced in a jet mill to an average grain size of about 5 microns, mixed with the lactose, and the powder mixture is evenly moistened with the starch paste and kneaded until a mass has formed that can be granulated. The plastic mass is pressed through a sieve of 4 to 5 mm. mesh and dried at 45° C. The dry granulate is passed through a sieve of 0.8 to 1.5 mm. mesh and homogeneously mixed with arrowroot, talcum and magnesium stearate. The mixture is formed in the usual manner into scored tablets of 6 mm. diameter. Gross weight per tablet: 100 mg.

Injection solutions containing 10 mg. of active ingredient per ml. of solution can be prepared, for example, from

| | |
|---|---|
| 3β - cyclohexylamino - acetylamino - cholestane hydrochloride, sterile microcrystals 20 microns _____mg__ | 10.0 |
| Polyhydroxyethylene - sorbitan monolaurate _____mg.__ | 0.05 |
| Sodium chloride _____mg__ | 9.0 |
| Methylcellulose, 100 centipoises _____mg__ | 50.0 |
| Sodium ethylmercurithiosalicylate _____mg__ | 0.05 |
| Distilled, sterile water to make _____ml__ | 1.0 |

The sodium chloride is dissolved in about ⅔ of the water, the solution heated to 80 to 90° C., and the methylcellulose is stirred in and passes into solution after cooling. The whole is made up to the volume, the solution filtered under pressure through a sterile filter (asbestos filtering layers) and sterilized in an autoclave for 20 minutes at 120° C. After having cooled, the solution must be stirred or shaken. The sodium ethylmercurithiosalicylate is then dissolved in a small amount of the suspending agent, and this solution filtered through a glass sinter filter Jena G3 and combined with the methylcellulose solution.

The polyhydroxyethylene sorbitan monolaurate is mixed with a small amount of suspending agent and likewise sterilized in an autoclave.

The sterile microcrystals of the active substance are first triturated under aseptic conditions with the solution of the wetting agent and then diluted with the remainder of the suspending agent.

If necessary, the suspension is homogenized with a bulb homogenizer.

The preparation is charged under aseptic conditions into 1 ml. sterile ampoules or 5 ml. sterile vials. The vials are closed with a suitable sterile stopper.

Oily injection solutions can be prepared as follows:

(a) Containing 10 mg. of active ingredient per ml.—

| | |
|---|---|
| 3β - cyclohexylamino - acetylamino - cholestane hydrochloride _____mg__ | 10.0 |
| Benzyl alcohol _____mg__ | 100.0 |
| Sesame oil to make up _____ml__ | 1.0 |

The active substance is dissolved in the benzyl alcohol, the solution is made up to the prescribed volume with sterile sesame oil and charged into 1 ml. or 2 ml. ampoules. The ampoules are sterilized in a hot air cabinet for 1½ hours at 160° C.

(b) Containing 5 mg. of active ingredient per ml.—
  3β - cyclohexylamino - acetylamino - choles -
    tane hydrochloride _____ mg__ 5.0
  Benzyl alcohol _____ mg__ 100.0
  Sesame oil _____ ml__ 1.0

The active substance is dissolved in the benzyl alcohol, the solution made up to the prescribed volume with sterile sesame oil and charged into 1 ml. or 2 ml. ampoules. The ampoules are sterilized in a hot air cabinet for 1½ hours at 160° C.

What is claimed is:
1. 3-(amino-acetylamino)-cholestanes of the formula

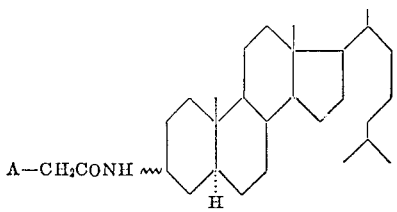

wherein A is a substituted amino group having one of the formulae

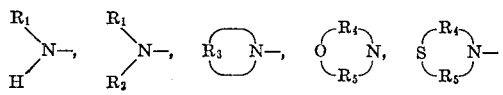

and

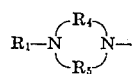

wherein $R_1$ and $R_2$ each stands for a member of the group consisting of lower aliphatic radicals, and cycloaliphatic radicals having 3 to 8 ring carbon atoms, $R_3$ represents an alkylene radical having 2 to 8 carbon atoms and $R_4$ and $R_5$ each represents lower alkylene radicals having together 1 to 4 chain carbon atoms.

2. An acid addition salt of a compound claimed in claim 1.

3. A quaternary ammonium compound of a compound claimed in claim 1.

4. A compound as claimed in claim 1, in which A stands for the cyclohexylamino group.

5. 3α-(amino-acetylamino)-cholestanes of the formula

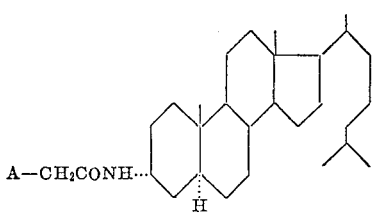

wherein A is a substituted amino group having one of the formulae

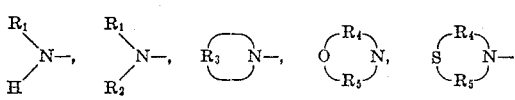

and

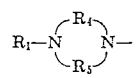

wherein $R_1$ and $R_2$ each stands for a member of the group consisting of lower aliphatic radicals, and cycloaliphatic radicals having 3 to 8 ring carbon atoms, $R_3$ represents an alkylene radical having 2 to 8 carbon atoms and $R_4$ and $R_5$ each represents lower alkylene radicals having together 1 to 4 chain carbon atoms.

6. A compound as claimed in claim 5, wherein A is a dilower alkyl-amino group.

7. A compound as claimed in claim 5, wherein A is a lower alkyleneamino group in which the lower alkylene radical contains from 4 to 6 carbon atoms.

8. A compound as claimed in claim 5, wherein A is the piperidino group.

9. A compound as claimed in claim 5, wherein A is the morpholino group.

10. A compound as claimed in claim 5, wherein A is the diethylamino group.

11. A compound as claimed in claim 5, wherein A is a lower alkyl amino group.

12. A compound as claimed in claim 5, wherein A is a cycloalkyl amino group in which the cycloalkyl radical has 5 to 7 ring carbon atoms.

13. A compound as claimed in claim 5, wherein A is the cyclohexylamino group.

14. A compound as claimed in claim 5, wherein A is the butylamino group.

15. 3β-(amino-acetylamino)-cholestanes of the formula

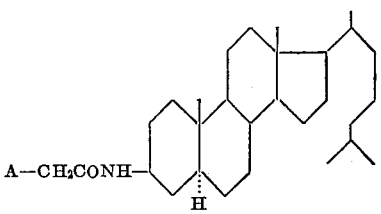

wherein A is a substituted amino group having one of the formulae

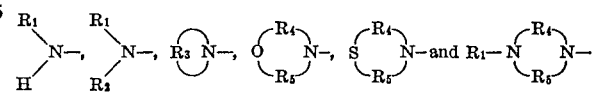

wherein $R_1$ and $R_2$ each stands for a member of the group consisting of lower aliphatic radicals, and cycloaliphatic radicals having 3 to 8 ring carbon atoms, $R_3$ represents an alkylene radical having 2 to 8 carbon atoms and $R_4$ and $R_5$ each represents lower alkylene radicals having together 1 to 4 chain carbon atoms.

16. A compound as claimed in claim 15, wherein A is a dilower alkyl-amino group.

17. A compound as claimed in claim 15, wherein A is a lower alkyleneamino group in which the lower alkylene radical contains from 4 to 6 carbon atoms.

18. A compound as claimed in claim 15, wherein A is the piperidino group.

19. A compound as claimed in claim 15, wherein A is the morpholino group.

20. A compound as claimed in claim 15, wherein A is the diethylamino group.

21. A compound as claimed in claim 15, wherein A is a lower alkyl amino group.

22. A compound as claimed in claim 15, wherein A is a cycloalkyl amino group in which the cycloalkyl radical has 5 to 7 ring carbon atoms.

23. A compound as claimed in claim 15, wherein A is the cyclohexylamino group.

24. A compound as claimed in claim 15, wherein A is the butylamino group.

References Cited

Djerassi et al., Journ. Org. Chem. 27 (1962), pp. 1112–3.

Tsatsas et al., Compt. Rend. Acad. Sci., 259 (1964), pp. 1972–4.

LEWIS GOTTS, *Primary Examiner.*

ETHEL G. LOVE, *Assistant Examiner.*